[11] 3,568,772

| [72] | Inventors | William B. Gogarty |
| | | Littleton, Colo.; |
| | | Walter B. Kirk, Jr., Robinson, Ill. |
| [21] | Appl. No. | 861,160 |
| [22] | Filed | Sept. 25, 1969 |
| [45] | Patented | Mar. 9, 1971 |
| [73] | Assignee | Marathon Oil Company |
| | | Findlay, Ohio |

[54] WELL STIMULATION WITH MICELLAR DISPERSIONS
25 Claims, No Drawings

[52] U.S. Cl. ................................................ 166/273, 166/274, 166/307
[51] Int. Cl. ........................................... E21b 43/22, E21b 43/27
[50] Field of Search .......................................... 166/307, 305, 273, 274, 275; 252/8.55 (D), 8.55 (C)

[56] References Cited
UNITED STATES PATENTS

| 2,356,205 | 8/1944 | Blair, Jr. et al. | 166/307UX |
| 3,254,718 | 6/1966 | Dunlap | 166/307 |
| 3,330,344 | 7/1967 | Reisberg | 166/274 |
| 3,343,602 | 9/1967 | Knox et al. | 166/307 |
| 3,421,585 | 1/1969 | Garcia | 166/307 |
| 3,467,188 | 9/1969 | Gogarty | 166/274 |
| 3,474,865 | 10/1969 | Gogarty et al. | 166/274 |

*Primary Examiner*—Stephen J. Novosad
*Attorneys*—Joseph C. Herring, Richard C. Willson, Jr. and Jack L. Hummel

ABSTRACT: The injectivity index of injection wells is increased by injecting 1—500 gallons of a micellar dispersion per vertical foot of oil-bearing formation followed by 1—500 gallons of acid per vertical foot of oil-bearing formation. The micellar solution also tends to clean the oil-bearing sand so that the acid can more effectively "work" on the formation. Water, e.g. 0.5—50 volumes per volume of acid, can be injected after the micellar dispersion and before the acid. After the acid is injected, normal injection of water can be continued.

WELL STIMULATION WITH MICELLAR DISPERSIONS

BACKGROUND OF THE INVENTION

U.S. Pat No. 3,254,714 to Gogarty et al. teaches the use of micellar solutions to efficiently recover crude oil from a reservoir. Such a process is especially useful in tertiary recovery, but is also useful in secondary recovery methods.

U.S. Pat. No. 2,356,205 to Blair et al. teaches that the productivity of a producing well can be increased by removing wax-associated occlusions within the immediate vicinity of the well bore. This is accomplished by contacting the strata with a micellar solution, permitting the solution to solubilize the occlusions and backflowing the well to permit the removal of the objectionable components up-hole.

Also, it is known that to accomplish an effective acidizing process, the well must be clean. That is, accumulated sludge, drilling mud, paraffin, sediments, etc. should be removed from the well bore before acidizing is effected on the well. Without removal of the above, the acidizing process will not be as efficient and effective.

SUMMARY OF THE INVENTION

Applicants have discovered that the injectivity index of an injection well can be improved by first injecting a micellar dispersion and then injecting a sufficient amount of an acid slug to further increase the injectivity index of the injection well. For example, from about 1 to about 500 gallons of a micellar dispersion can be injected followed by from about 1 to about 500 gallons of an acid, the gallons of dispersion and acid based on vertical foot of oil-bearing formation. Thereafter, water can be injected through the injection well. Preferably from about 0.5 to about 50 volumes of water per volume of acid are injected before the acid is injected. This technology is also applicable to increasing the injectivity of disposal wells—the terms "oil-bearing formation" are meant to be replaced with "formation capable of receiving disposable fluids" where the technology is used for disposal wells.

DESCRIPTION OF THE INVENTION

The term "micellar dispersion" as used herein is meant to include micellar solutions, "microemulsions" [Schulman and Montagne, Annals of the New York Academy of Sciences, 92, pages 366–371 (1961')], "transparent" emulsions (Blair Jr. et al., U.S. Pat. No. 2,356,205) and micellar dispersion technology taught by C. G. Sumner, Clayton's, The Theory of Emulsions and Their Technical Treatment, 5th Edition, pp. 315—320 (1954). Examples of useful micellar solutions include those taught in U.S. Pat. Nos. 3,254,714; 3,275,075; 3,301,325; 3,330,344; 3,307,628; and 3,348,611. The micellar dispersion can be oil-external or water-external.

Normally, the amount of micellar dispersion need be sufficient to extend from the face of the well bore to only three to twenty feet into the formation. Preferably, the amount of injected dispersion need displace (including solubilization, etc.) substantially all hydrocarbon from the pores in the formation adjacent the well bore to at least 7 and no more than 15 feet. It is realized that the dispersion will probably be dissipated prior to reaching a production well, however, the increase in injectivity index materially aids in the flooding operation. Also, the micellar dispersion cleans sections of the well bore where water was not previously entering, thus allowing acid to enter more of the "potentially" productive formation.

The micellar dispersions are comprised of hydrocarbon, aqueous medium, and at least one surfactant. One or more cosurfactants (also identified as cosolvents, cosolubilizers, and semipolar organic compounds) are useful in the dispersions. Also, electrolytes are useful in the dispersions. The micellar dispersions are, for purposes of this invention, relatively stable dispersions and can show some Tyndall effect, but generally do not. These micellar dispersions can contain other additives, e.g. corrosion and scale inhibitors, bactericides, etc. The dispersions can contain for example, from about 4 percent to about 85 percent hydrocarbon, from about 10 to about 90 percent water, and at least about 4 percent surfactant, the percents based on volume. In addition, from about 0.01 to about 20 percent by volume of cosurfactant and up to about 5 percent or more by weight of electrolyte in the aqueous phase can optionally be incorporated into the micellar dispersion.

Examples of hydrocarbon include crude oil (both sweet and sour), partially refined fractions thereof, e.g. side cuts from crude columns, crude column overheads, gas oils, kerosene, heavy naphthas, naphthas, straight run gasoline, and liquefied petroleum gases, refined fractions of crude oil and halogenated hydrocarbons. Pure hydrocarbons are also useful, e.g. paraffinic compounds including liquefied petroleum gases, propane, pentane, heptane, decane, dodecane, etc.; cycloparaffin compounds including cyclohexane, etc.; aryl compounds including mono as well as polycyclic compounds and substituted products thereof including toluene, alkyl phenols, etc. and combinations of the hydrocarbons taught herein. Based on economics, the preferred hydrocarbon is one locally available and is crude oil. The unsulfonated hydrocarbon (e.g. heavy vacuum gas oils) in petroleum sulfonates is also useful.

The aqueous phase can be composed of soft, brackish, or brine water. Preferably, the water is soft but it can contain small amounts of salts which are compatible with the ions in the subterranean formation being flooded.

Surfactants include the various nonionic, cationic, and anionic surfactants. Examples of useful surfactants include those found in U.S. Pat. No. 3,254,724 to Gogarty et al.

Preferably, the surfactant is a petroleum sulfonate, also known as alkaryl sulfonates or alkaryl naphthenic sulfonates. The sulfonates can contain less than 60 percent but preferably contain 60—100 percent active sulfonate. Examples of preferred surfactants include sodium and ammonium petroleum sulfonates having an average equivalent weight within the range of from about 360 to about 520, and more preferably from about 400 to about 470. The surfactant can be a mixture of low and high average equivalent weight sulfonates or it can be a mixture of different surfactants.

Examples of useful cosurfactants include alcohols, amino compounds, esters, aldehydes and ketones containing from 1 up to about 20 or more carbon atoms and more preferably from about 3 to about 16 carbon atoms. The cosurfactant is preferably an alcohol, e.g. isopropanol, n- and isobutanol, the amyl alcohols such as n-amyl alcohol, 1- and 2-hexanol, 1- and 2-octanol, decyl alcohols, alkaryl alcohols such as p-nonyl phenol and alcoholic liquors such as fusel oil. Particularly useful alcohols include the primary butanols, primary pentanols and secondary hexanols. Concentrations of from about 0.01 percent to about 5 percent by volume are preferred and more preferably from about 0.2 percent to about 3 percent. Mixtures of two or more cosurfactants are also useful.

Electrolytes useful within the micellar dispersions include inorganic bases, inorganic acids, inorganic salts, organic bases, organic acids, and organic salts. These electrolytes include those being strongly or weakly ionized. Preferably, the electrolytes are inorganic bases, inorganic acids and inorganic salts, examples include sodium hydroxide, sodium chloride, sodium sulfate, hydrochloric acid, sulfuric acid, sodium nitrate, ammonium chloride, ammonium hydroxide, and potassium chloride. Examples of other useful electrolytes can be found in U.S. Pat. No. 3,330,344. The type and concentration of preferred electrolyte will depend on the hydrocarbon phase, aqueous phase, surfactant, cosurfactant, reservoir fluids, and reservoir temperature. Generally from about 0.001 to about 4 percent by weight of electrolyte in the aqueous medium is useful with this invention.

The micellar dispersion can be prepared by dissolving the surfactant in the hydrocarbon and then adding the water. However, the surfactant can also be included in the aqueous medium and then mixed with the hydrocarbon. Preferably, the surfactant and cosurfactant are dissolved in the hydrocarbon, and water is then added incrementally with agitation.

The amount of micellar dispersion injected into the formation depends upon the thickness of the oil-bearing formation or "pay" sand (that is, the permeable part of the formation containing crude oil in amounts feasible for recovering) or formation capable of receiving disposable fluids. Such oil-bearing sands can vary in thickness from about 4 feet or less to about 3,000 feet and possibly higher. From less than about 1 to about 500 or more gallons of micellar dispersion per vertical foot of oil-bearing sand is useful with this invention. Larger quantities may be useful, however, the increased cost associated therewith generally is not favorable with the results as compared to smaller quantities. Generally from about 25 to about 200 gallons per vertical foot of oil-bearing formation give significant results.

Acids useful with the invention include any acid which will effectively "work" on the reservoir rock to increase the capability of that rock to receive larger quantities of water or disposable fluids at a given pressure. For example, acids are useful to dissolve scale (e.g. carbonate, iron sulfide, etc.), solubilize undesirable materials, etc. and, in general, chemically "attack" the rock to obtain more effective areas to facilitate the flow of fluids. Also, the particular acid chosen will depend upon the type of rock, i.e. sandstone vs. carbonate, etc. Examples of useful acids include hydrochloric (this term is meant to include muriatic acid), nitric acid, sulfuric acid, hydrofluoric, combination of nitric and hydrochloric, citric, etc. The acids can also contain certain additives to give desired characteristics, e.g. the acid can contain corrosion and scale inhibitors, sequestering agents, deemulsifying agents, surface-active agents, agents to lower the viscosity of the acid, penetrating agents, bactericides, etc. and the acid can be inhibited to obtain desired characteristics. Different concentrations of acid in water are useful, e.g. concentrations of 5—38 percent and preferably 15 percent hydrochloric are useful.

The volume of acid injected into the well bore depends upon the characteristics of the rock, the depth of the oil-bearing rock, the degree of acid recommended to chemically treat the rock so that higher injection rates can be realized, etc. Generally from about 2 to about 250 gallons of acid per vertical foot of oil-bearing formation is useful with this invention. More preferably, from about 5 to about 50 gallons of acid per vertical foot of oil-bearing rock are useful. However, smaller as well as larger amounts of acid may be useful with particular wells.

The micellar dispersion can be immediately followed by the acid and the acid immediately followed by water. However, the micellar dispersion is preferably followed by water and this, in turn, followed by acid and then normal water injection initiated. In addition, the micellar dispersion and acid can be permitted to remain in contact with the oil-bearing formation for a period of time up to about 6 hours or more before water is injected into the injection well to displace the micellar dispersion and/or acid out into the reservoir. However, a contact time of about 1 hour is generally sufficient for the acid. Also, a pulsating pressure may be effected on the reservoir rock to swab the acid in and out of the reservoir rock. In addition, the acid may be swabbed up-hole before the injection well is returned to the injection of water.

The mobility of the micellar dispersion is preferably about equal to or greater than the mobility of the formation fluids, i.e. the interstitial water and oil. Mobility of the acid is preferably about equal to or greater than the mobility of the interstitial water. These mobilities are based on flowing fluids, i.e. the micellar dispersion and acid and formation fluids flowing through the formation rock.

Preferably, the micellar dispersion and acid are injected into the formation at a pressure below the formation fracture pressure. However, the acid can be injected at pressures exceeding the formation fracture pressure.

The process of this invention increases the injectivity index of the injection well. Injectivity index as used herein is defined as the injection rate in barrels per day to the excess pressure above reservoir pressure which causes that injection rate. It can be defined by the formula:

$$\text{Injectivity Index} = I = \frac{q}{(p_w - p_e)} \text{ bbl./day/p.s.i.}$$

wherein $p_w$ is the sand—face pressure, $p_e$ is the reservoir static pressure measured at a point about equal distance between the injection and producing wells and $q$ is the injection rate in bbl/day.

The invention is not to be limited by the specific embodiments taught herein. Rather, all equivalents obvious to those skilled in the art are meant to be equated with the invention as defined in the specification and appended claims.

We claim:

1. A process of increasing the injectivity index of an injection means in fluid communication with a subterranean oil-bearing formation, the process comprising injecting into the injection well a micellar dispersion in an amount sufficient to displace substantially all of the crude oil from no more than the pore space adjacent the well bore to a distance of from about 3 to about 20 feet, and then injecting into the injection means a sufficient amount of acid to increase the capability of the reservoir rock to receive larger injection rates of water and thereafter injecting water into the formation.

2. The process of Claim 1 wherein from about 1 to about 500 gallons of the micellar dispersion per vertical foot of oil-bearing formation is injected.

3. The process of claim 1 wherein from about 1 to about 500 gallons of acid per vertical foot of oil-bearing formation is injected.

4. The process of claim 1 wherein the mobility of the micellar dispersion is about equal to or greater than the mobility of the formation fluids flowing in the subterranean formation.

5. The process of claim 1 wherein the mobility of the acid is about equal to or greater than the mobility of the interstitial water flowing in the subterranean formation.

6. The process of claim 1 wherein the micellar dispersion is an oil-external dispersion.

7. The process of claim 1 wherein the micellar dispersion is a water-external dispersion.

8. The process of claim 1 wherein the acid is hydrochloric acid.

9. The process of claim 1 wherein the micellar dispersion and/or acid is permitted to remain in contact with the formation immediately adjacent the well bore for a period of time up to about 6 hours before being displaced out into the formation.

10. The process of claim 1 wherein water is injected into the injection means before the acid is injected into the injection well.

11. The process of claim 10 wherein from about 0.5 to about 50 volumes of water per volume of acid are injected in the injection means.

12. The process of claim 1 wherein the micellar dispersion and acid is injected into the formation at a pressure less than the formation fracture pressure.

13. The process of claim 1 wherein the micellar dispersion is comprised of hydrocarbon, aqueous medium, and surfactant.

14. The process of claim 13 wherein the micellar dispersion contains cosurfactant and/or electrolyte.

15. A process of recovering crude oil from a subterranean oil-bearing subterranean formation having an injection means in fluid communication with a production means, the process comprising injecting into the injection means from about 1 to about 500 gallons of a micellar dispersion per vertical foot of oil-bearing formation, and then injecting into the injection means from about 1 to about 500 gallons of acid per vertical foot of oil-bearing formation and then injecting water into the injecting means to displace the micellar dispersion and acid out into the formation and recovering crude oil through the production means.

16. The process of claim 15 wherein the micellar dispersion is comprised of hydrocarbon, aqueous medium, and surfactant.

17. The process of claim 15 wherein the micellar dispersion contains cosurfactant and/or electrolyte.

18. The process of claim 15 wherein the acid is hydrochloric acid.

19. The process of claim 15 wherein the water is injected after the micellar dispersion and before the acid is injected into the injection means.

20. The process of claim 19 wherein from about 0.5 to about 50 volumes of water per volume of acid are injected into the injection means.

21. The process of claim 15 wherein the micellar dispersion and/or acid are permitted to remain in contact with the oil-bearing formation for a period of time up to about 6 hours before water is injected to displace the micellar dispersion and/or acid out into the formation.

22. The process of claim 15 wherein from about 2 to about 250 gallons of acid per vertical foot of oil-bearing formation are injected into the injection means.

23. A process of increasing the injectivity index of a disposal means in fluid communication with a subterranean formation, the process comprising injecting into the disposal means from about 1 to about 500 gallons of a micellar dispersion and then injecting into the means from about 1 to about 500 gallons of an acid, the gallons of micellar dispersion and acid based on vertical foot of formation capable of receiving disposable fluids, and thereafter continuing normal operation of the disposal means.

24. The process of claim 23 wherein from about 0.5 to about 50 volumes of water per volume of acid are injected into the disposal means before the acid is injected.

25. The process of claim 23 wherein the micellar dispersion and/or acid are permitted to remain in contact with the formation in the immediate area of the disposal means for a period of time up to about 6 hours before being displaced out into the formation.

UNITED STATES PATENT OFFICE
CERTIFICATE OF CORRECTION

Patent No. 3,568,772        Dated  March 9, 1971

Inventor(s)  W. B. Gogarty et al

It is certified that error appears in the above-identified patent and that said Letters Patent are hereby corrected as shown below:

Column 2, line 29:   Delete "3,254,724" and insert "3,254,714".

Signed and sealed this 22nd day of June 1971.

(SEAL)
Attest:

EDWARD M. FLETCHER, JR.
Attesting Officer

WILLIAM E. SCHUYLER, JR
Commissioner of Patents